Figure 1:
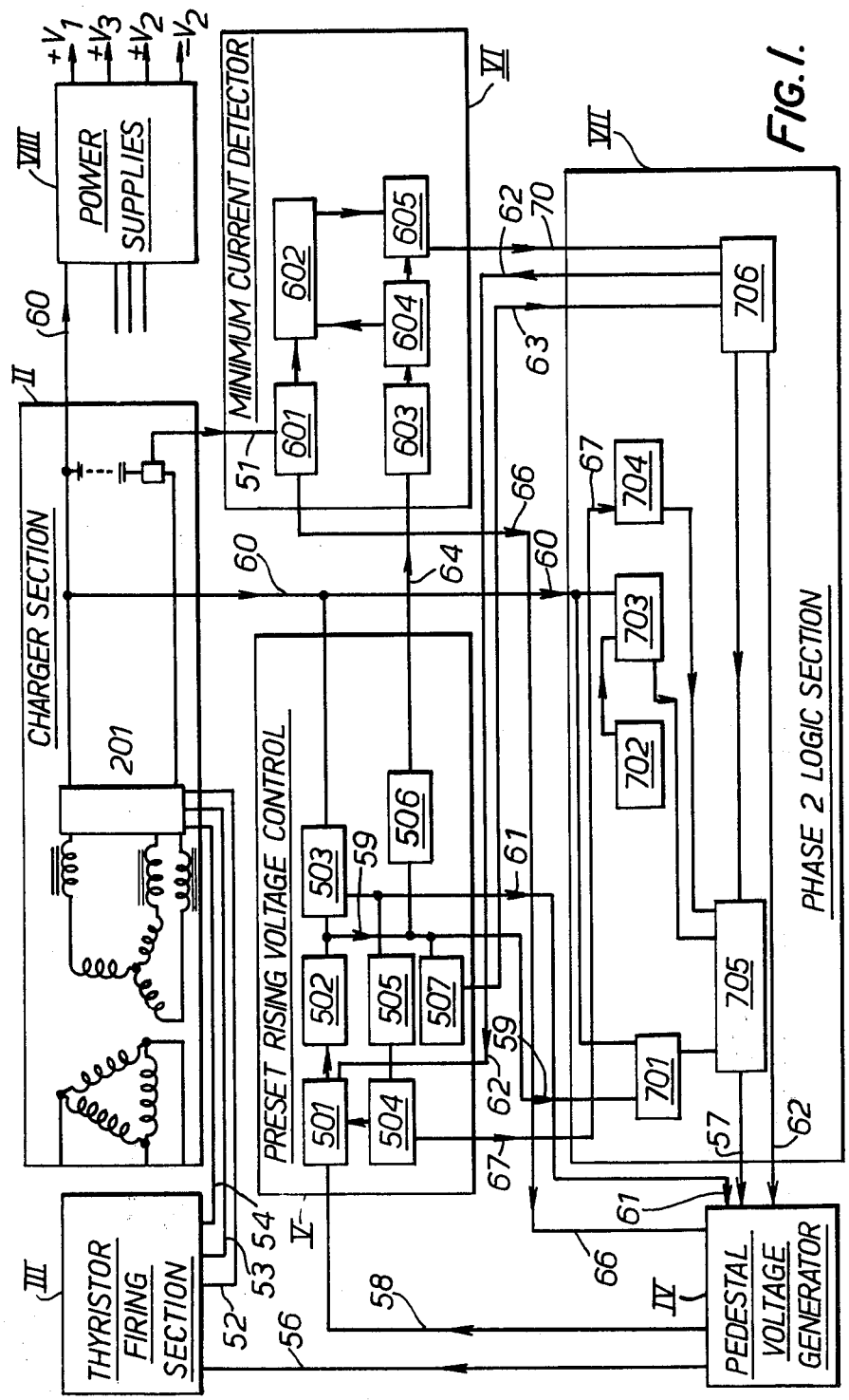

United States Patent [19]

Clayton et al.

[11] 3,912,108
[45] Oct. 14, 1975

[54] AUTOMATIC ELECTRIC BATTERY CHARGING APPARATUS

[75] Inventors: Dennis Albert Clayton, Gawsworth; George William Foster, Bolton, both of England

[73] Assignee: Chloride Legg Limited, Wolverhampton, England

[22] Filed: July 9, 1974

[21] Appl. No.: 486,847

[30] Foreign Application Priority Data
Sept. 7, 1973 United Kingdom............... 32572/73

[52] U.S. Cl. ...................... 320/39; 320/23; 320/32; 323/73
[51] Int. Cl.² .......................................... H02J 7/04
[58] Field of Search ............. 320/20.46, 21, 30, 39, 320/40, 48, 37, 22, 23, 32; 323/73, 97, 94

[56] References Cited
UNITED STATES PATENTS

| | | | |
|---|---|---|---|
| 3,217,225 | 11/1965 | Gottlieb et al......................... | 320/37 |
| 3,273,143 | 9/1966 | Wasserman....................... | 323/73 X |
| 3,487,284 | 12/1969 | Cady................................ | 320/21 X |
| 3,660,748 | 5/1972 | Clayton............................... | 320/39 |
| 3,794,905 | 2/1974 | Long................................ | 320/39 X |

FOREIGN PATENTS OR APPLICATIONS

| | | | |
|---|---|---|---|
| 1,227,630 | 4/1971 | United Kingdom.................. | 320/37 |
| 1,438,002 | 10/1968 | Germany ............................ | 320/46 |

Primary Examiner—J. D. Miller
Assistant Examiner—Robert J. Hickey
Attorney, Agent, or Firm—Watson, Cole, Grindle & Watson

[57] ABSTRACT

In an automatic charging apparatus for charging discharged electric batteries, the battery voltage is compared with a reference voltage which is progressively increased, which the charging current is automatically adjusted during at least a phase of the charge to bring the battery voltage closer to the reference voltage. The means for increasing the reference voltage comprise a pulse generator, a binary counter for counting the pulses, and a digital to analogue converter of R-2R ladder type for converting the count of the counter into an analog signal representing the reference voltage.

22 Claims, 8 Drawing Figures

AUTOMATIC ELECTRIC BATTERY CHARGING APPARATUS

This invention relates to automatic electric battery charging apparatus.

The invention is in certain respects an improvement in or modification of that set forth in the present applicant's British Patent Specification No. 1304839.

That specification describes automatic charging apparatus for charging discharged electric batteries, including means for establishing a reference voltage, a comparator for comparing the battery voltage with the reference voltage, and means for automatically adjusting the charging current during at least a phase of the charge to bring the battery voltage closer to the effective reference voltage, and means for progressively increasing the reference voltage.

It will be appreciated that what is required is that the battery voltage should be adjusted to a progressively increasing value. This could be achieved by employing a constant reference voltage and comparing it with a progressively decreasing proportion of the battery voltage. In a preferred arrangement, however, a constant proportion of the battery voltage is compared with an actual reference voltage which is progressively increased.

Such apparatus provides a particularly versatile arrangement for fast charging of batteries. To some extent it can be regarded as an improvement on the well known system known as the I.U.I. system in which the charge comprises an initial portion in which the charging current is controlled to a substantially constant value, a middle portion in which the charging current is controlled so as to maintain the voltage at a substantially constant value and a final portion in which the charging current is controlled to a much lower substantially constant value. The time taken to fully charge a discharged battery naturally depends upon the magnitude of the charging current and any increase of the latter reduces the time required. In the early stages of the charge there is almost no limit to the current that can be passed through the battery, but at a certain stage, normally when gasing begins, the current must be drastically reduced in order to avoid damage to the battery. This is achieved in the I.U.I. system by keeping the voltage constant during the middle portion of the charge during which, if the current were kept constant, the voltage would rise and hence if the current is adjusted to keep the voltage constant, this will involve rapid reduction of the current. It is however impracticable to charge the battery fully at constant voltage, or, if it is possible, it would take an inordinate time. Accordingly, in the I.U.I. system, at an appropriate value of current, the circuit is switched over to a constant current mode at which the charge is completed.

A number of advantages arise from progressively increasing the effective value of the reference voltage in accordance with the prior specification. In the first place the time taken for the charge is decreased since the current is not reduced so rapidly as it is in the I.U.I. system, although it is still reduced sufficiently to avoid damage to the battery. Secondly the charge can be completed while controlling to the progressively increasing reference voltage since this voltage can be made to increase until it equals the voltage of a fully charged battery while on charge at a reasonably low current. The variation of current then also provides a simple and reliable signal when the charge is complete. Thus when gassing occurs, the current will be rapidly reduced in order to keep the battery voltage down to the reference value. As the battery reaches its fully charged condition the voltage naturally reaches a constant value (at constant current), and hence it is necessary to increase the charging current in order to follow the progressively rising reference voltage; this increase of current, following a decrease of current provides a signal when the battery is fully charged.

A further advantage is that the apparatus is extremely versatile in that an apparatus of a given size can be employed to charge any battery of a wide range of sizes without danger to the battery, and in a reasonably short time, if not in all cases the shortest possible time. Thus in the I.U.I. system the final constant current stage must be chosen to occur at a current appropriate to the capacity of the particular battery, and hence the arrangement can only be employed for batteries of a very limited range of capacities. In the present arrangement a given charger can be used for charging batteries having a range of capacities of perhaps 20 to 1 or more, or, conversely, a given battery can be charged by chargers having a similar range of capacity. Where the battery is very small in relation to the charger, its voltage will be rapidly brought up to the reference value and thereafter the current will be adjusted to that necessary to keep the voltage at the progressively rising reference value, irrespective of the capacity of the battery, that is to say the current will be tailored to suit the capacity of the battery. On the other hand, if the battery is very large in relation to the charger, the charger will deliver its maximum possible charging current for a large part of the charging period, or even for the whole charging period. In either case the battery will be charged without any adjustment by the user and without any danger to the battery, although obviously a very large battery connected to a very small charger can never in any circumstances be charged in less than a certain minimum time.

The present invention is concerned with various detailed improvements to apparatus of the type referred to above.

According to the present invention the means for increasing the reference voltage comprise a pulse generator, a binary counter for counting the pulses, and a digital to analogue converter for converting the count of the counter into an analog signal representing the reference voltage. The converter is conveniently of R-2R ladder type.

In one form of the invention the reference voltage is kept constant at the beginning of the charge until the battery voltage reaches a predetermined value (for example 2.36 v.p.c. (volts per cell) in the case of a lead acid battery).

Preferably the apparatus includes ramp current controlling means for restricting the rate of change of charging current when it is switched on and/or when it is adjusted to match the progressively rising reference voltage.

Thus the battery charging current may be restricted so as to rise gradually when the battery voltage falls short of the progressively rising reference voltage, and to fall gradually when the battery voltage exceeds the progressively rising reference voltage.

In one form of the invention the means for increasing the reference voltage are arranged to increase it at either of two different rates, and are controlled by the comparator to select the higher rate when the battery voltage exceeds the reference voltage and the lower rate when the battery voltage falls short of the reference voltage.

Thus the pulse generator conveniently comprises a resistor capacitor network connected to a programmed unijunction transistor and means controlled by the comparator serves to change the effective value of the resistor depending on whether the battery voltage exceeds or falls short of the reference voltage.

As described in the prior specification referred to above, the apparatus preferably includes a minimum current detector for responding when the charging current begins to rise towards the end of the charge and then terminating the charge or a phase of it. As indicated above, if the charger is employed for a very large battery in relation to its output current, it is possible that the voltage of the battery will never overtake the reference voltage, or will not do so within a resonable time, so that the whole charge takes place at substantially the maximum current output of the charger. In view of this the apparatus preferably also includes a maximum voltage detector arranged to terminate the charge or a phase of it if the reference voltage exceeds a predetermined maximum value (e.g., 2.90 volts per cell in the case of a lead acid battery).

In one form of the invention the minimum current detector includes a pulse generator whose frequency is proportional to the charging current, and a programming counter and an up/down counter for counting the pulses, the up/down counter being controlled by the programming counter so as to count up for an up period (e.g. 2 minutes) then to store the count for a first interval (e.g. 12 minutes) and thereafter to count down for a down period slightly less than the up period, and zero detecting means serving to terminate the charge, or a phase of it, only when the up/down counter returns to zero, that is to say if the frequency applied to the up/down counter, and representing the value of the charging current, is greater in the down period than in the up period. The zero detecting means may comprise an OR gate connected to the appropriate stages of the binary counter to give a signal when the count therein reaches the zero value.

Conveniently the programming counter is fed from a clock pulse generator and is arranged to adjust the latter to increase its frequency during the down period, to a value higher than that during the up period, so that an equal count occurs in a short period.

It will be appreciated that when the charger is first switched on, the current will tend to rise, and, to prevent this from switching off the charge, or a phase of it, the apparatus may include means for rendering the minimum current detector operative only when the reference voltage exceeds a given intermediate value, to prevent the minimum current detector from responding when the charging current begins to rise in the early stages of the charge. Such means may include an OR gate connected to the appropriate stages of the reference voltage binary counter and serving to give a signal when the reference voltage reaches the intermediate value (for example 2.40 volts per cell in the case of the lead acid battery) and continue to give a signal at any higher value of the reference voltage.

After the battery is fully charged, the charge may be terminated, i.e. the apparatus may be switched off, but preferably it is switched over to continue with a topping up charge that may be continued indefinitely. Thus the apparatus may include means for delivering a main phase of the charge for the battery and terminating the main phase of the charge to give a topping-up phase during which a charging current is switched on when the open-circuit voltage of the battery reaches a predetermined lower value and switched off when it rises above a predetermined higher value. Such means may include means for storing the value of the reference voltage reached at the minimum current during the first phase of the charge, to provide the said predetermined higher value. In addition, it may be desirable to include maximum time limiting means for switching off the battery charging current after it has been switched on for a predetermined time interval if the battery voltage has failed to reach the predetermined higher value.

Preferably the switching on of the charging current is subject to ramp current control means for restricting the charging current when switched on to a gradually charging value. Such ramp current controlling means may be the same as those employed in the first or main phase of the charge.

Thus during the topping-up charge, the apparatus may include means for intermittently switching the charging current on and off during at least a phase of the charge automatically, the switching on of the charging current being controlled automatically by means responsive to the battery voltage so as to switch on when the open circuit voltage of the battery falls to a given lower value (for example 2.18 volts per cell in the case of a lead acid battery) including ramp current controlling means for restricting the charging current when switched on to a gradually increasing value, to afford time for the battery voltage to respond to the charging current.

The ramp current controlling means may be arranged to restrict the charging current so as to rise from zero to its maximum value in not less than several minutes, for example three minutes.

Conveniently the ramp current controlling means includes a resistor-capacitor network connected to a field effect transistor arranged in a source-follower configuration.

During the main phase of the charge the battery charging current may be under phase control, for example thyristor control, in which case the apparatus conveniently includes means for adjusting a voltage, which will be termed a pedestal voltage, means for providing a ramp voltage changing progressively during each half cycle, means for comparing the ramp voltage with the pedestal voltage and triggering the phase control means when the difference changes sign. Means may be included for effecting an initial fast rise of the pedestal voltage until the battery charging current begins to flow and thereafter limiting the rate of rise of the pedestal voltage and hence, of the battery charging current (for example so as to reach a maximum value in about three minutes).

Figure 2:
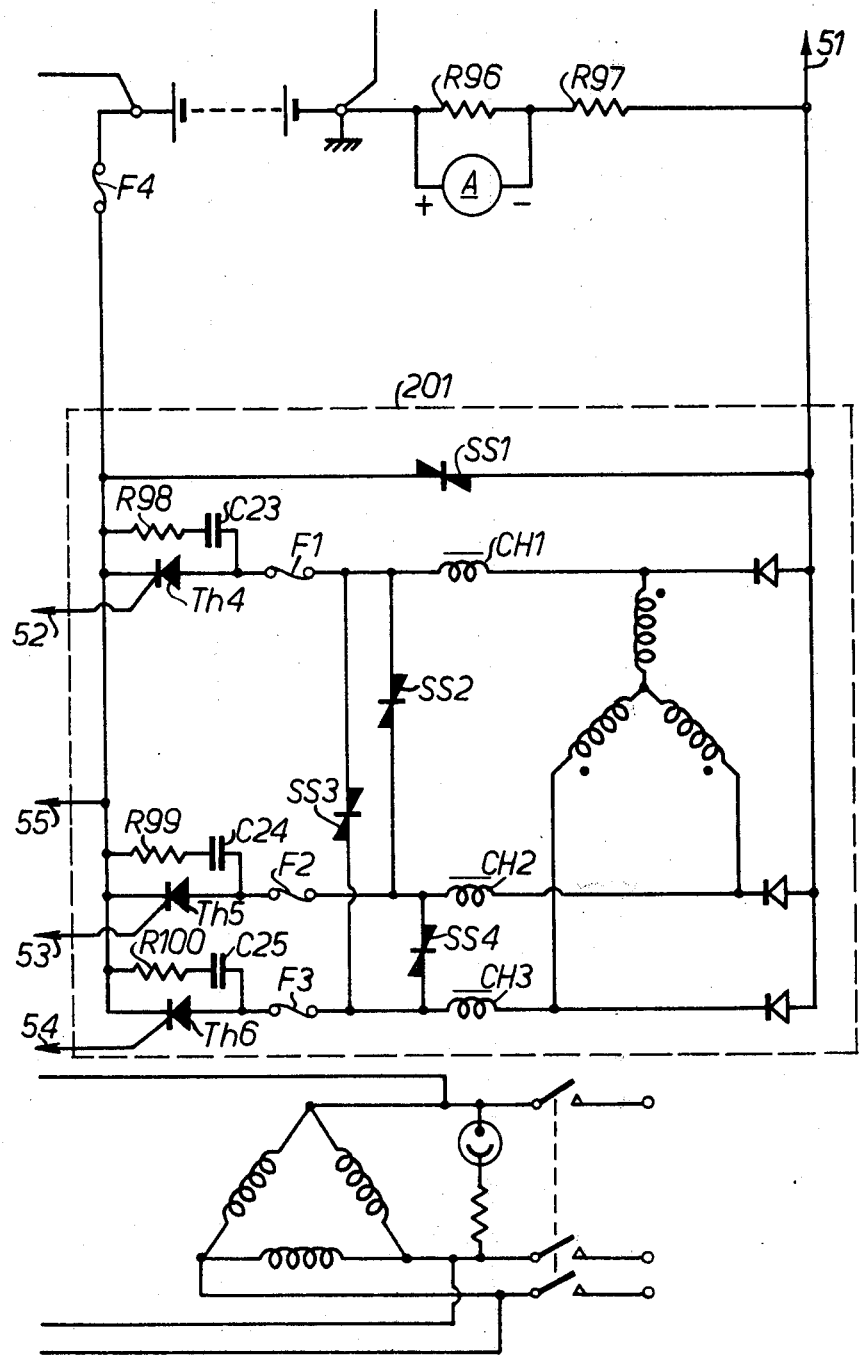
Figure 3:
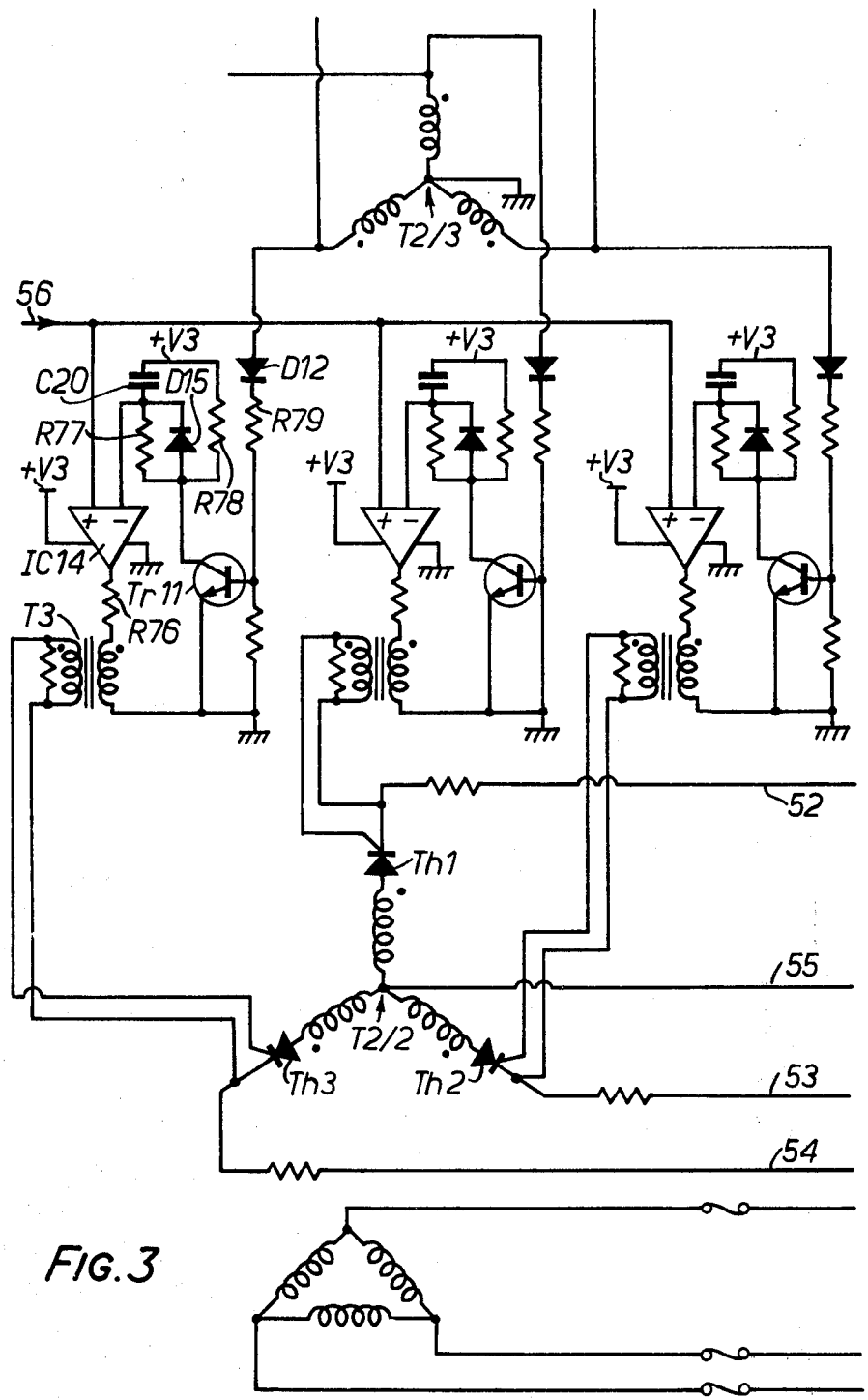
Figure 4:
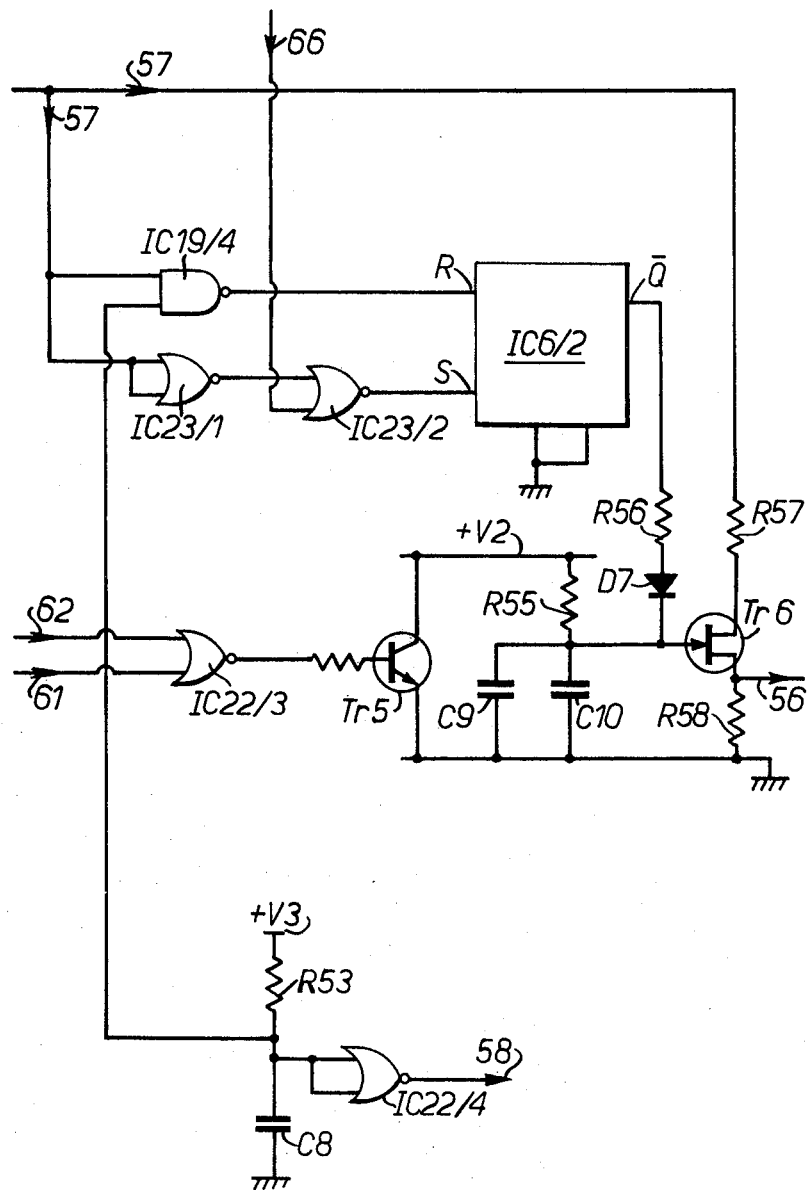
Figure 5:
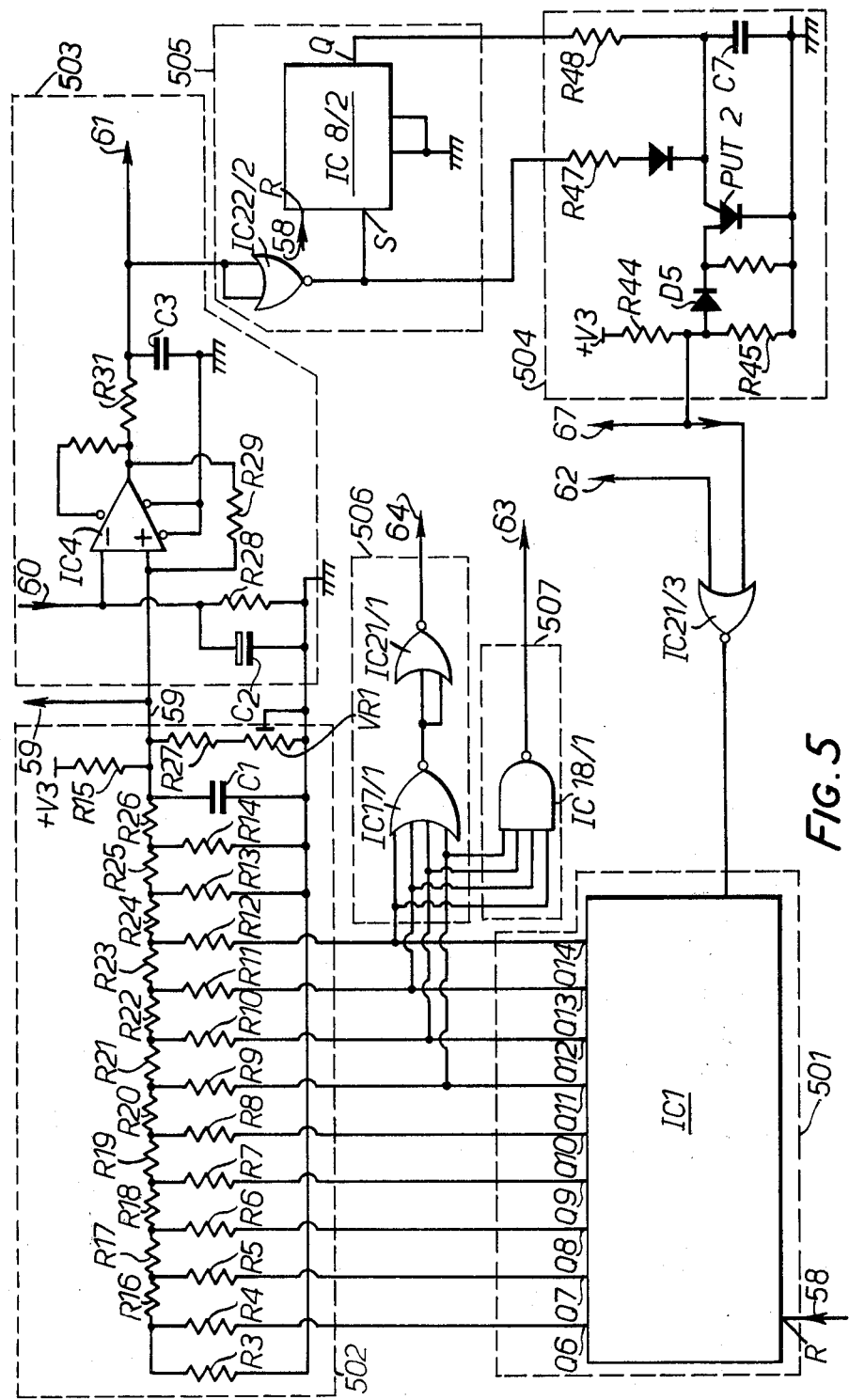
Figure 6:
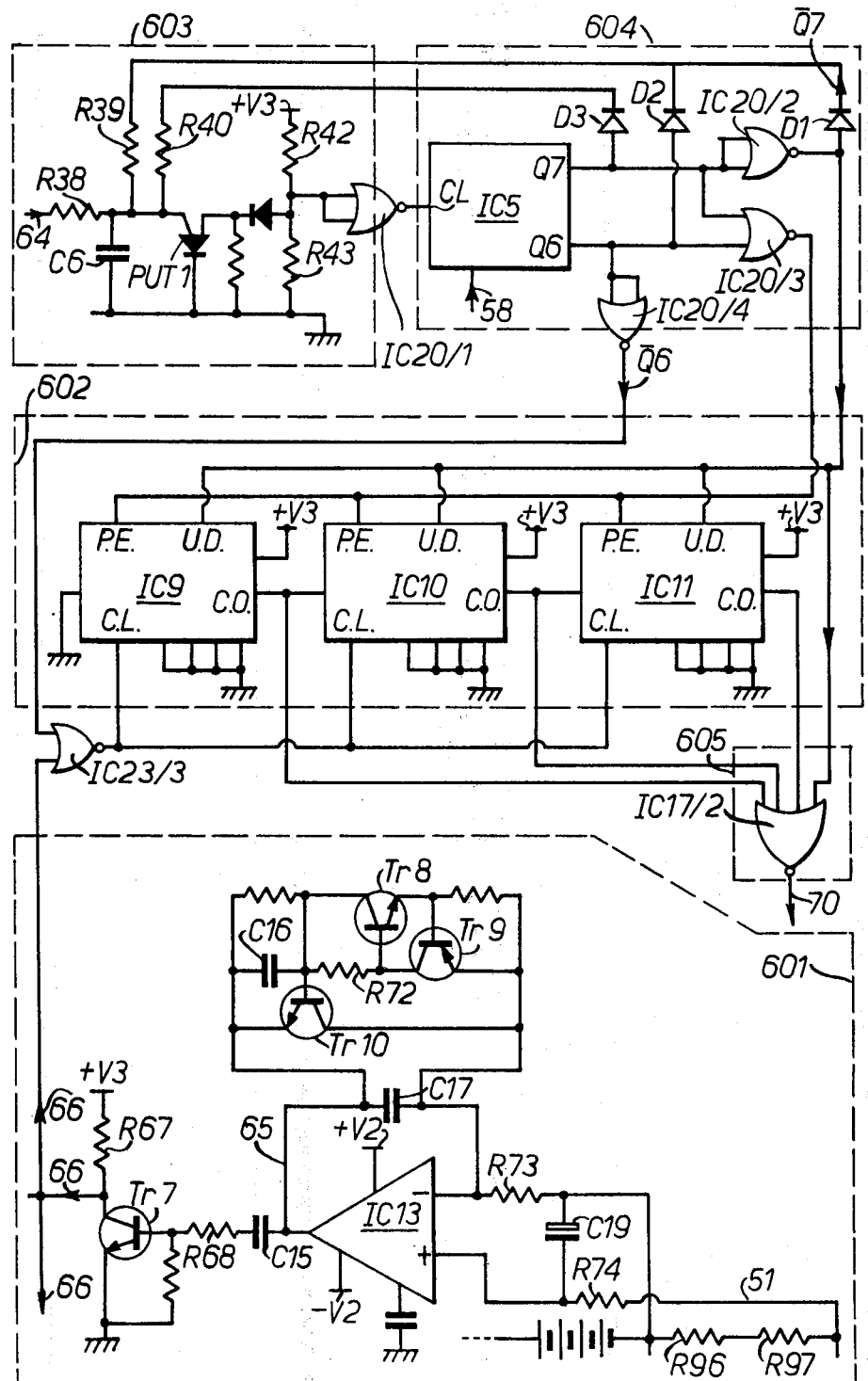
Figure 7:
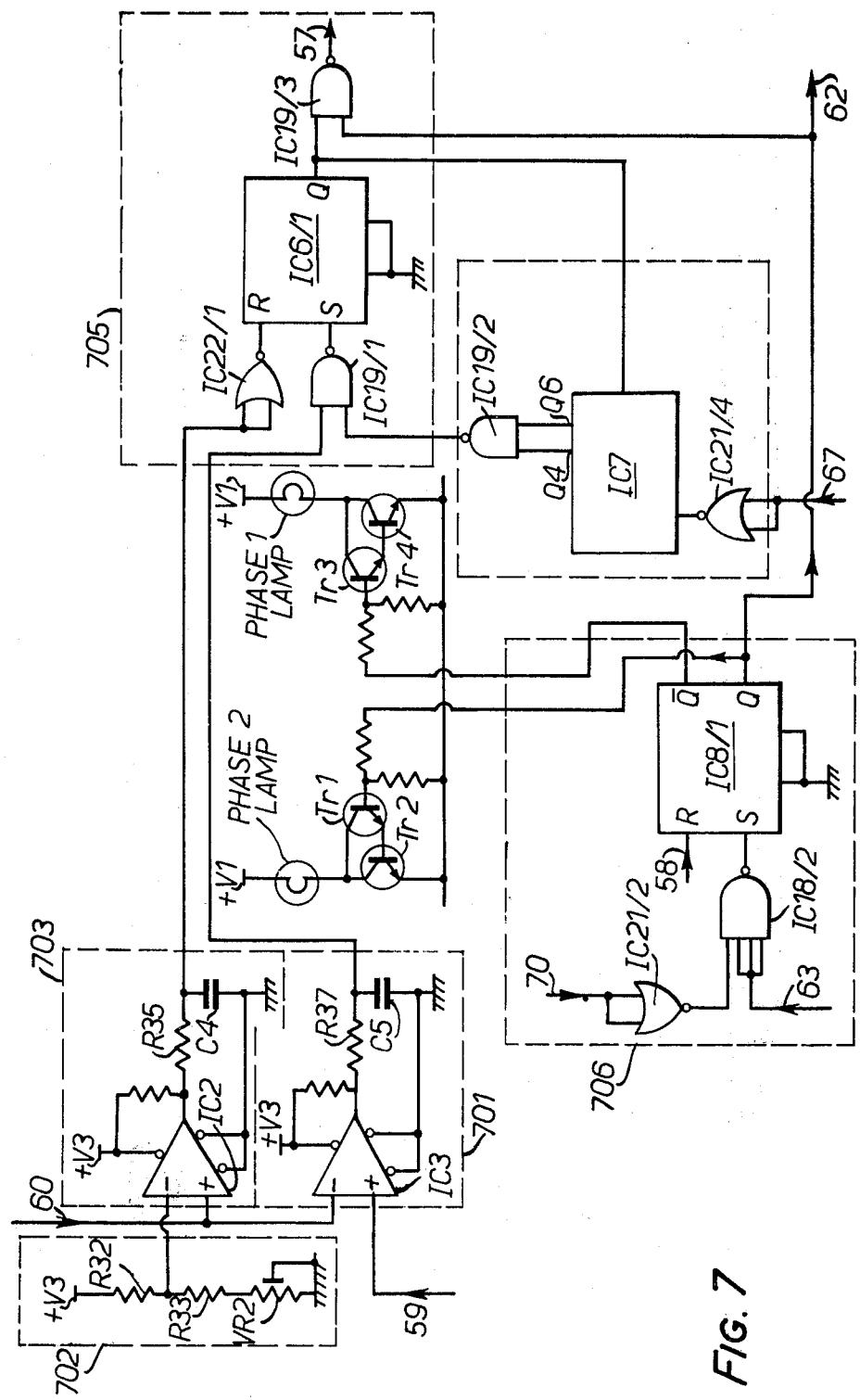
Figure 8:
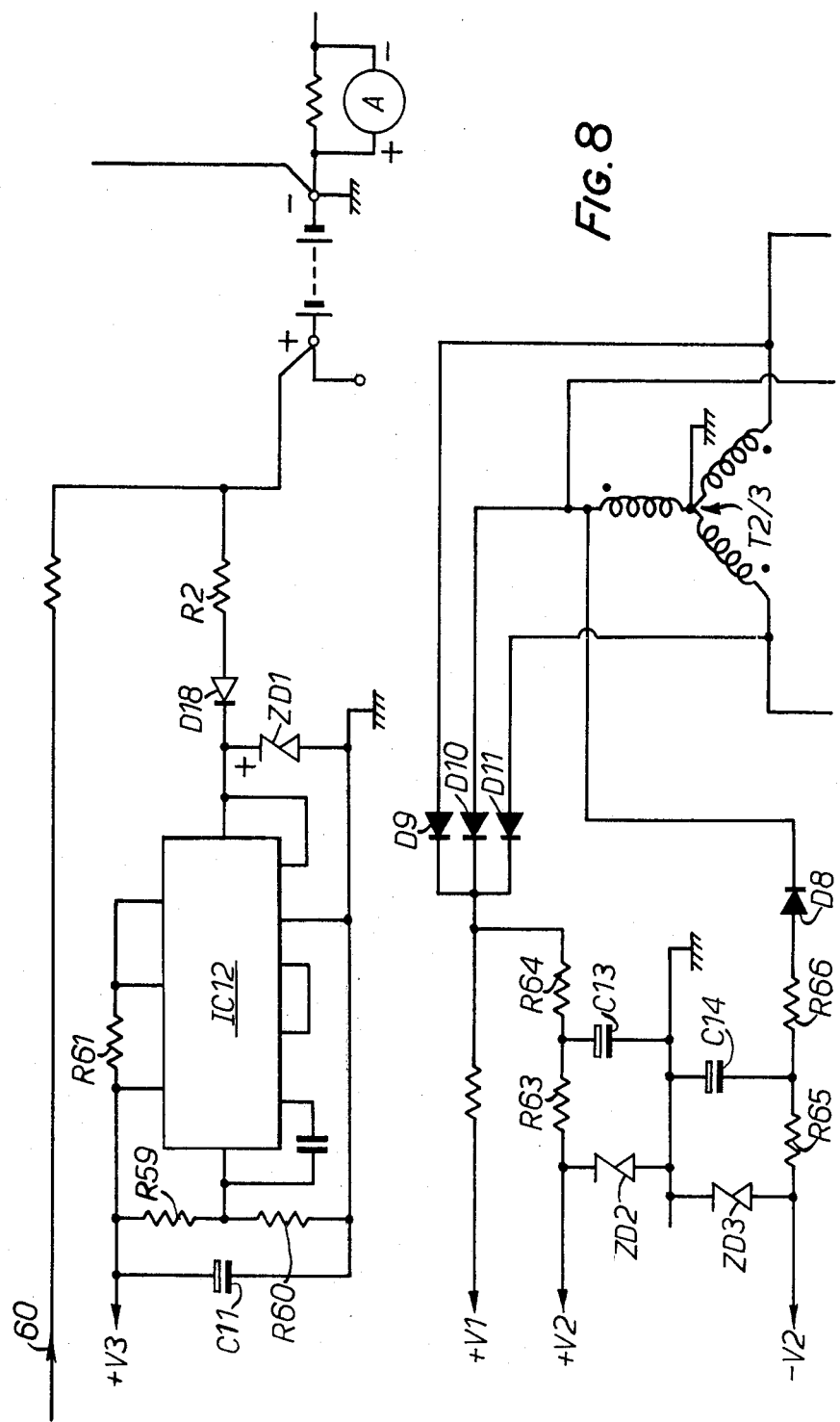

Further features and details of the invention will be apparent from the following description given by way of example, of one specific embodiment of the invention with reference to the accompanying drawings in which:

FIG. 1 is a block diagram of a charging apparatus intended primarily for charging the batteries of a battery driven bus, and FIGS. 2 to 8 are circuit diagrams showing the blocks of FIG. 1 in more detail, namely:

FIG. 2 shows the charger section;
FIG. 3 shows the thyristor firing circuit;
FIG. 4 shows the pedestal voltage generator;
FIG. 5 shows the preset rising voltage control;
FIG. 6 shows the minimum current detector;
FIG. 7 shows the phase 2 logic section; and
FIG. 8 shows the power supplies.

For convenience, certain components appear in two sections in order to show their relationship to the remaining components of each of the sections in question.

The apparatus is designed first to deliver a main charge, termed Phase 1, during which the charging current is controlled automatically to bring the battery as rapidly as possible to a fully charged condition. During the first part of this phase the charging current will normally remain substantially constant at the maximum current the charger is capable of delivering. When the voltage reaches a given value the charging current begins to be automatically reduced to keep the battery voltage in line with a progressively rising reference voltage, and this regime continues until the battery is fully charged. At that point, signalled by a minimum current detector responding to the fact that the charging current is trying to rise again (as it would have to in order to raise the voltage of a battery already fully charged) the apparatus switches over to Phase 2, which is a topping-up charge at an average value of charging current which can be continued indefinitely without damage to the battery.

The characteristics and arrangement of the apparatus will now be described in more detail.

OPERATIONAL CHARACTERISTICS

Phase 1 charge

At the start of charge the current builds up slowly from zero to a maximum over a period of 3 minutes.

The charge proceeds at maximum current without control until the battery voltage reaches the equivalent of 2.36 V/c. (Volts per cell). From then on the charge current is controlled to limit the rate of rise in battery voltage to 0.1 V/c. per hour.

With these control conditions applied at this stage in the charge, i.e. after gassing has started, the charge current gradually reduces. This reduction in charge current continues until the battery reaches its normal top-of-charge voltage. From then on, in order to maintain the rate of rise in voltage of 0.1 V/c per hour, the charge current begins to increase.

The change in the charge current characteristic, i.e. the transistion through a minimum point where the current stops falling and begins to rise again, is detected and phase 1 of the charge is terminated. Phase 2 of the charge follows immediately.

In some cases the battery may be very large in comparison with the charger output and consequently the charge current available may not be capable of maintaining the 0.1 V/c per hour rise in voltage. In these cases the charge current remains at a maximum throughout the charge and no minimum point occurs. To allow for this event the phase 1 charge has a maximum time limit, after which it is terminated independently of the battery condition. This time limit, e.g. 20 hours, starts for the time the battery voltage reaches 2.36 V/c.

For the intermediate cases where the battery size is such that the charger is capable of maintaining a 0.1 V/c rate of rise over a portion of the charge, the phase 1 time limit is reduced by an amount depending on the length of time for which the 0.1 V/c rate of rise could be maintained.

Phase 2 charge

The battery receives charge in pulses. Each pulse is initiated when the battery voltage decays to the equivalent of 2.18 V/c. At the start of the pulse the charge current builds up slowly from zero to a maximum value, the rate of rise being such that it would reach the maximum current output of the charger after about 3 minutes.

The current pulse is terminated when either:
a. the battery voltage reaches the value attained at the end of the phase 1 charge, or
b. a period of 4 minutes elapses.

CIRCUIT FUNCTIONS

The basic circuit functions required and the method of implementating them, will now be briefly described with reference to the block diagram of FIG. 1, before describing details of individual circuit sections with reference to FIGS. 2 to 8. Each section bears a roman numeral corresponding to the number of the figure in which further details of it are shown Charger Section II The charger section II comprises a transformer and half controlled thyristor/diode bridge rectifier 201 fitted with the usual fuses and surge suppression networks. Ballast is provided by A.C. chokes fitted between the transformer secondary winding outputs and the rectifier. The values of the transformer secondary voltages and the choke inductances are chosen so as to give a fairly flat taper characteristic to the charge current.

Current sensing resistors, comprising ammeter shunts, are fitted so that the charge current can be monitored. Two such shunts are used in series to increase the voltage signal.

The charge current is controlled by varying the firing angle of the thyristors, i.e. phase control.

Thyristor Firing Section III

The thyristor firing angle is varied by the ramp and pedestal method, the height of the voltage pedestal being controlled by the logic circuits.

A mains-synchronised half-cycle sawtooth waveform, with a negative going ramp voltage, is applied to the inverting input of an operational amplifier. A pedestal voltage (d.c. control voltage) is applied to the non-inverting input. The amplifier output changes state and energises a pulse transformer when the ramp voltage falls to the value of the pedestal voltage. Thus the latter controls the point in the mains half cycle at which a pulse transformer delivers an output pulse.

The pulse transformers are coupled to slave thyristors which gate the main rectifier thyristors from an auxiliary transformer power supply.

Pedestal Voltage Generator IV

The final control signal obtained from the logic sections is in the form of a train of pulses of fixed amplitude but of varying duty cycle ("on" to "off" ratio). This needs to be converted to the equivalent D.C. value before it can be applied to the thyristor firing section. This conversion is done by the pedestal voltage generator.

The pedestal voltage generator comprises an RC integrator coupled to a F.E.T. source follower. The integrator has a long time constant, e.g. 3 minutes, so that the D.C. output voltage across the source follower resistor cannot rise faster than a predetermined rate. This places the required constraint on the rate of rise of current at the start of charge. The method also gives a smooth control of the current throughout the charge by having a gradual response at a fixed rate irrespective of the rate of change of input signal. This latter effect is important in maintaining a balanced charger load across the mains power supply phases, since it prevents random firing of the thyristors.

A second control circuit is included in the pedestal voltage generator whose function is to overcome the unnecessary delay when there is no charging current at all at the start of the charge when the thyristor firing pulses are fully retarded. This delay occurs because conduction cannot start until the firing pulses have been advanced to the point where the transformer output voltage exceeds the battery voltage. The second control circuit comprises an extra charging source for the integrator capacitors so as to raise the pedestal control voltage rapidly. As soon as a small charging current flows into the battery the extra charging source is cancelled and the pedestal voltage then continues to rise at the normal slow rate.

Preset Rising Voltage (PRV) Control V

A voltage comparator 503 compares the battery voltage per cell with a slowly rising reference voltage. It gives an output which causes the charge current to increase if the battery voltage is below the reference voltage and to decrease if it is above the reference voltage. Thus the battery voltage is kept in step with the rising reference voltage.

The rising reference voltage is obtained by the analogue conversion of the outputs of a binary counter 501 driven by a programmed oscillator 504. The latter is inoperative until the battery voltage reaches the equivalent of 2.36 V/c.

The analogue conversion of the counter outputs is achieved by a conventional R-2R resistor ladder network 502 connected directly to the counter outputs. The initial value of the output voltage of the ladder network, with all counter outputs at zero, is arranged to be 2.36V. Thus the first signal from the voltage comparator occurs when the battery voltage reaches the equivalent of 2.36 V/c. This event triggers a latching circuit to cause the oscillator to pulse the counter at a preset minimum rate throughout the remaining period of the phase 1 charge. In addition, each time the battery voltage per cell exceeds the reference voltage the voltage comparator output signal causes the oscillator to speed up (through a circuit 505), thereby pulsing the counter at a preset maximum rate.

Thus from 2.36 V/c onwards, the reference voltage has two rates of rise. Firstly a minimum rate which is independent of the battery voltage and secondly a maximum rate which occurs if the charger output is capable of keeping the battery voltage per cell rising at this faster rate. The minimum rate is arranged to be, for example, 0.025V per hour and the maximum rate 0.1V per hour.

The Maximum time limit for the phase 1 charge period is obtained by sensing a given count entered into the preset rising voltage (PRV) counter. Since this is pulsed at a preset minimum rate it will take a known maximum time to reach a given count.

The count detector comprises a multi-input NAND gate with its inputs connected to the required counter outputs. When these outputs are all in the "1" state the NAND gate gives an output signal to terminate phase 1. The count chosen for terminating phase 1 represents an analogue voltage higher than that normally attained by the battery during charge, for example 2.90 V/c.

It is appreciated that the PRV counter may be pulsed at the faster rate for a period as determined by the charger's capability to maintain the faster rate of rise of battery volts equivalent to 0.1 V/c per hour. In this case it is obvious that the above NAND gate will operate and terminate phase 1 sooner. Thus the maximum phase 1 time is reduced by an amount determined by the period for which the counter was pulsed at the faster rate.

A further detector responding at any count above 2.40 V is described in the next section.

Minimum Current Detector VI

This detector comprises two main subsections, a current-to-frequency converter 601 and a specially programmed up/down binary counter 602.

A voltage signal representative of the pulsating charge current is obtained from current sensing resistors. This is first smoothed to an average D.C. voltage by a RC network, then passed to a conventional integrating circuit which includes a capacitor reset circuit. The latter is simply a voltage sensitive trigger circuit across the integrating capacitor which discharges the capacitor rapidly when a preset voltage is reached. The integrator output is passed through a differentiating circuit to provide an output pulse each time the integrating capacitor is discharged. Thus the repetition rate of this output pulse is directly proportional to the battery charging current.

The up/down counter is programmed to become operative when the rising reference voltage reaches 2.40V. Basically the counter is then cycled to a preset value in which it receives pulses from the current-to-frequency converter during a short sampling period at the beginning and end of a given time interval. The latter could be for example 16 minutes. At the beginning of this inverval the counter is put into the up count mode and is allowed to receive pulses for say 2 minutes. The count acquired during this first sampling period is then stored in the counter for say 12 minutes. At the end of this time the counter is changed to the down count mode and the second sampling period is initiated. In this case however the duration for which the counter receives pulses is arranged to be say 5% shorter than the first sampling period, i.e. 1.9 minutes. Thus the counter will only be returned to zero when the current during the second sampling period is 5% or more greater than the current during first sampling period. A counter zero detector 605 gives an output signal to terminate the phase 1 charge when this occurs.

Thus over a given interval of say 16 minutes the current must increase by 5% or more before a signal is delivered by the minimum current detector. A constant current or decreasing current results in the counter failing to reach zero during a sampling period and in this case no signal occurs. The counter is then reset for the start of a further cycle as above.

Phase 2 Logic Section VII

A signal from the minimum current detector or the phase 1 maximum time limit detector changes the state of the outputs of a bistable circuit. The latter imposes phase 2 logic conditions on the thyristor control circuits and also stops the PRV counter from receiving any further clock pulses. Thus the rising reference voltage remains henceforth at the final value reached just prior to the change over to phase 2.

Under phase 2 logic conditions a further bistable circuit switches the pedestal voltage generator on and off in response to signals from two voltage comparators sensing the battery voltage. For the majority of the phase 2 time the pedestal voltage generator is switched off. Thus the charge current is zero and the battery is virtually on open circuit. The first voltage comparator monitors the open circuit battery voltage and as soon as this decays to the equivalent of 2.18 V/c it changes the bistable output in the direction so as to switch on the pedestal voltage generator.

The charge current then builds up slowly, as the pedestal voltage rises, in a similar manner to the start of the phase 1 charge.

As soon as charge current starts flowing the battery voltage begins to increase. This time the battery voltage is monitored by the second voltage comparator. The latter has one of its inputs connected to the battery, via an attenuator, and the other input connected to the rising reference voltage (which is now held constant at its last value on phase 1). Thus as soon as the battery voltage reaches the final value it attained on phase 1, the second voltage comparator changes the bistable output back to the open circuit state. The pedestal voltage generator is switched off and the charge current returns to zero. The above sequence of events is then repeated indefinitely.

As in phase 1 a maximum time limit to the current pulse is imposed to allow for the cases where the battery is large in comparison with the charger and the output of the latter insufficient to raise the battery voltage to the required switch off level. (This would occur if phase 1 had been terminated by the maximum time limit, in which case the reference voltage would be left standing at the high value of say 2.90 V/c). In phase 2 the maximum time limit of say 4 minutes is obtained from a binary counter coupled to a gating circuit. The counter is pulsed at a fixed rate so that after say 4 minutes an output is delivered from the gating circuit to the control bistable to switch the charge current back to zero independently of the battery voltage.

Circuit Details

The circuit will now be described in more detail with reference to FIGS. 2 to 8. These show the invention applied to a three phase charger as an example. Digital logic is implemented by integrated circuits from the standard RCA C/mos range. The voltage comparators used are integrated circuit amplifiers.

Charger Section II FIG. 2

The charger section is a conventional arrangement for a 3 phase charger with a half controlled bridge rectifier 201. The controlled elements are the thyristors Th4, Th5 and Th6 which receive gate pulses from the thyristor firing section shown in FIG. 3, to vary the charging current in accordance with a voltage signal which will be referred to as a pedestal voltage.

The thyristors are protected against voltage surges by RC networks R98, R99 and R100, C23, C24 and C25, and non-linear voltage devices SS1 to SS4. Fuses F1 to F4 provide current overload protection. Chokes CH1 to CH3 provide the charger with the desired charge current taper characteristic.

Resistors R96 and R97, in series with the battery, provide a voltage signal proportional to the charge current. This signal is delivered by a line 51 to the current-to-frequency converter of the PRV control unit (described below under that heading FIG. 5). The battery negative terminal represents the system common point or zero voltage line, and connections to it will in general not be described.

Thyristor Firing Section III FIG. 3

This section contains three similar pulse circuits, one for each phase. Only one therefore needs to be described. This will be the left hand circuit.

A secondary winding T2/2 of an auxiliary transformer T2 delivers phase synchronising sinusoidal voltage signals to each pulse circuit in the current phase rotation sequence. At a certain point in the 3 phase sequence a transistor Tr11 is switched on for the duration of half a mains cycle due to current flowing through a diode D12 and resistor R79 to the transistor base. When this occurs a capacitor C20 charges through a resistor R77 and the transistor TR11. The voltage on its lower plate therefore falls exponentially. At the end of the synchronising half cycle the capacitor C20 is rapidly reset by the discharge path provided by a resistor R78 and diode D15.

A voltage comparator IC 14 has its inverting input connected to the lower plate of the capacitor C20 and its non-inverting input connected to a D.C. control voltage, referred to as the pedestal voltage, supplied to a line 56 from a pedestal voltage generator (described below under that heading FIG. 4). The value of the pedestal voltage varies according to the charge current requirements of the battery. When the falling voltage on the lower plate of the capacitor C20 coincides with the pedestal voltage the output voltge of the voltage comparator IC 14 changes from zero to some positive value. A surge of current is delivered to a pulse transformer T3 via a resistor R76. The resulting pulse signal from the secondary winding of the pulse transformer is delivered to the gate of the slave thyristor Th3.

The three slave thyristors Th1, Th2 and Th3 switch gate power to the main thyristors Th4, Th5 and Th6 in the correct phase sequence. This gate power is supplied from a secondary winding T2/2 of the auxiliary transformmer T2, through lines 52, 53 and 54 connected to the gates of the main thyristor Th4, Th5 and Th6 whose cathodes are connected by a lead 55 to the neutral point of the winding T2/2.

Pedestal Voltage Generator IV FIG. 4

The pedestal control voltage for controlling the thyristor firing section is supplied to the line 56 from the source resistor R58 of a F.E.T. Tr6. The latter is connected in the conventional source follower configuration where the voltage at the source terminal follows that at the gate terminal. The gate is connected across capacitors C9 an C10 which are charged and discharged through a resistor R55. Thus the pedestal voltage rises or falls as the capacitors C9 and C10 are charged or discharged respectively. A resistor R57 connected to the drain of the F.E.T. limits the value to which the pedestal voltage can rise. This resistor R57 is returned via a line 57 to the output of a NAND gate IC 19/3 which is held at a constant voltage +V3 during phase 1 charge period, as described under the heading Phase 2 Logic Section(FIG. 7).

The capacitors C9 and C10 are charged from a constant voltage D.C. supply +V2 (described below under Power Supplies, FIG. 8) which has a relatively high internal resistance. Logic signals are supplied from a NOR gate IC 22/3 to a transistor TR5 which becomes either a short circuit or an open circuit across the +V2 supply in response to these logic signals. When it is an open circuit the voltage +V2 is applied to charge up the capacitors C9 and C10 and the pedestal voltage rises to increase the battery charging current. When Tr5 is a short circuit the +V2 supply falls to zero voltage and the capacitors C9 and C10 discharge via R55 and Tr5. This causes the pedestal voltage to fall and the battery charging current to decrease.

The time constant of the RC circuit R55, C9 and C10 is chosen so that with the transistor Tr5 in the open circuit state, i.e. no input signal, the pedestal voltage requires about 3 minutes to rise from its minimum to its maximum value. Since it must always start from its minimum value, the thyristor firing pulses start from a fully retarded position when the battery is first placed on charge. As the pedestal voltage rises the firing point is slowly advanced and the battery charge current increases slowly. The thyristor firing pulses become fully advanced and the battery charge current a maximum after about 3 minutes, assuming no logic signals are applied to the transistor Tr5 during this time.

With logic signals applied to the transistor Tr5 the pedestal voltage rises and falls slowly in response to them. The thyristor firing pulses are advanced and retarded slowly and quite smoothly to impart a smooth control over the battery charging current. This method of control spreads the current loading equally over the phases of the mains supply. The current levels are changed equally in all phases and the tendency for locking on to one phase to supply a certain minimum battery current is prevented.

In order to overcome the unnecessarily long delay before battery charge current begins to flow at the start of charge, the thyristor firing pulses are advanced at a relatively fast rate until a certain minimum current flows. This is achieved by supplying an extra charging current to capacitors C9 and C10 from the $\overline{Q}$ output of a bistable circuit IC 6/2 via a resistor R56 and blocking diode D7. As soon as a certain minimum battery charging current begins to flow a NOR gate IC 23/2 sets the bistable $\overline{Q}$ output to a "low" or "0" state and the capacitors C9 and C10 continue charging up at the normal rate, i.e. via the resistor R55 only.

The bistable circuit IC 6/2 is initially reset, with its output in a "high" or "1" state by the action of a NAND gate IC 19/4 connected to its reset "R" input. One input of the NAND gate is connected to the line 57 from the phase 2 logic section which is held in the high or 1 state throughout phase 1 charging. The other input of the NAND gate is connected to the capacitor C8 of a logic initial reset section. This comprises the capacitor C8 which is charged up via a resistor R53 as soon as the +V3 power supply is made (the latter is derived from the battery as described below). The reset section includes an inverter IC 22/4 connected to the capacitor C8 so as to provide an initial reset signal on a line 58, which starts at logical 1 then falls to logical 0, after about 1 second, when the input voltage rises above the switching threshold level of the inverter. This controls a number of bistables and other counters (as described below under the heading Phase-2 Logic Section FIG. 7)

When the battery is first connected and the +V3 supply made the output of the NAND gate IC 19/4 is in the 1 state due to the voltage across the capacitor C8 being initially zero. This 1 state resets the $\overline{Q}$ output of the bistable IC 6/2 to the 1 state and rapid charging of capacitors C9 and C10 occurs.

As soon as a certain minimum battery charging current occurs, e.g. 2 amperes, the current-to-frequency converter (described below under the heading Minimum Current Detector FIG. 6) is activated and a pulse signal is passed (via line 66) to one input of the NOR gate IC 23/2 connected to the set S input of the bistable IC 6/2. This places a 1 signal at the S input to change the $\overline{Q}$ output to the 0 state. The other input of the NOR gate IC 23/2 is connected, via an inverter IC 23/1, to the line 57 from the phase 2 logic section (described under that heading FIG. 7) which is held in the 1 state throughout phase 1 charging. This has no effect on the operation of the bistable until phase 2 starts.

Preset Rising Voltage (PRV) Control V (FIG. 5)

To establish a progressively rising preset reference voltage a conventional binary R-2R ladder resistor network, 502 represented by resistors R3 to R26, is connected to a counter (501) IC.1. All the series resistors are of equal valve and all the parallel resistors are of equal value, the value of each parallel resistor being twice that of a series resistor; hence the term R-2R ladder. The ladder is connected to the +V3 supply via a resistor R15. The output is taken from the junction 59 of R15 and the remainder of the ladder network. This output is the rising reference voltage.

The output of the ladder network is at a minimum when the lower ends of the resistors R3 to R14 are connected to the zero voltage line. For any R-2R ladder network this minimum voltage has a value equal to half the supply voltage, i.e. half of the +V3 voltage. However the minimum value can be preset to any desired value by the use of an additional resistor across the output. This is the purpose of a resistor R27 and potentiometer VR1 connected across the ladder output. With this means the minimum output voltage can be preset to the desired value, for example 2.36V.

As with all R-2R ladder networks, when the lower end of the resistors R4 to R14 are connected in binary sequence, from left to right, to the positive voltage line and then to the zero voltage line, the output voltage rises in equal steps to a maximum value. Without the additional resistors, R27 and VR1, this maximum would be equal to two thirds of the positive supply voltge. The maximum value is reduced by the use of R27 and VR1 across the ladder output.

In the present application the lower ends of the resistors R4 to R12 are switched between the positive supply +V3 and the zero voltage line in binary sequence by connecting them to the outputs of a C/mos 14 stage binary counter IC1. Resistors R13 and R14 remain connected to the zero voltage line since the required voltage range is obtainable without the use of these resistors in the switching circuit. Resistors R4 to R12 are connected to the counter outputs Q6 to Q14 respectively. The counter outputs are of the so called totem pole type where a low resistance connection is made either to the positive supply or the zero voltage line according to whether the output is a 1 or a 0 state respectively. A capacitor C1 smooths out the switching transients at the ladder output.

The binary counter is reset initially to the zero count state by a positive pulse on the reset R input via the line 58 from the initial reset gate IC 22/4 (FIG. 4). The output of the R-2R ladder is then set at the start of the phase 1 charge to 2.36V, for example. This is the starting point for the rising reference voltage.

The battery voltage is compared with the reference voltage at the ladder output by a voltage comparator IC4. The reference voltage on line 59 is connected to the non-inverting input of IC4. The battery positive terminal is connected to the inverting input of IC4 via a voltage divider R1 and R28 through a line 60 (FIG. 2). A capacitor C2 is connected across the battery input of the comparator to smooth out the voltage ripples due to the pulsating nature of the battery charging current. The comparator switching action is improved by a small amount of positive feedback provided by a resistor R29 connected between the output and the non-inverting input. The output of the comparator is taken through a RC filter R31, C3 to remove noise spikes before being applied to the circuits via a lead 61.

At the start of phase 1 charge the battery input voltage to the comparator is less than the reference voltage of 2.36V, therefore the comparator output is in the high or 1 state. The comparator filter output 61 is applied to one input of the NOR gate IC 22/3 which controls the pedestal voltage output (FIG. 4). The output of this gate is therefore put into the 0 state, transistor Tr5 is open circuit and the charge current rises to a maximum and remains there.

In addition, the comparator output 61 controls the oscillator which provides clock pulses for the 14 stage binary counter IC1. This oscillator is the conventional arrangement for a programmable unijunction transistor pulsing circuit where PUT 2 is the programmable unijunction transistor. Temperature stability is provided by a diode D5. The pulse rate is determined by resistors R47 and R48 which provide charging current to a capacitor C7. Negative going rectangular pulses are obtained from the junction of resistors R44 and R45. These pulses, after passing through a NOR gate IC 21/3 to become positive going pulses, are applied to the clock input of the reference voltage counter IC1. The other input of the NOR gate IC 21/3 is connected (by a line 62) into the phase 2 logic section (FIG. 7) and is held in the 0 state during phase 1 to enable clock pulses to pass through the gate.

The oscillator 504 has a timing resistor R48 fed from the Q output of a bistable circuit IC 8/2 of the circuit 505. This is initially reset to the 0 state by a positive pulse to the reset R input via the line 58 from the initial reset gate IC 22/4 (FIG. 4). Thus no charging current is supplied to C7 via R48 at the beginning of phase 1 charge.

The oscillator timing resistor R47 is fed from the output of an inverter IC 22/2 which is also connected to the set S input of the bistable IC 8/2. The input of this inverter is connected via the line 61 to the filter output of the voltage comparator IC4 of the voltage comparator circuit 503. Thus, with the latter in the 1 state, a 0 state is applied to resistor R47 and the set S input of the bistable IC 8/2 and therefore neither R47 nor R48 supplies charging current to C7 of the oscillator. Hence the oscillator is stopped and no clock pulses are delivered to the reference voltage counter IC1. The reference voltage remains at the initial value of 2.36V.

In the above condition the battery charge current remains at a maximum and no change occurs in the logic states until the battery voltage reaches the equivalent of 2.36 V/c. The battery voltage dividers R1 and R28 are so arranged that the voltage appearing, via the line 60, at the inverting input of the comparator IC4 is equal to the battery voltage divided by the number of cells in the battery. Thus when the battery voltage reaches 2.36 V/c then a voltage of 2.36V appears at the comparator inverting input. This causes the comparator output to change its state from logical 1 to logical 0.

The output of NOR gate IC 22/3 (FIG. 4) now changes to a 1 state, the transistor Tr5 becomes a short circuit to cause the pedestal voltage and thus the battery charge current to slowly decrease.

In addition, the output of the inverter IC 22/2 changes to a 1 state. This sets the Q output of the bistable IC 8/2 to a 1 state and charge current flows to C7 via R48. This condition remains until the battery is disconnected from the charger. The resistor R48 supplies a relatively low charge current to C7 to provide a minimum oscillation pulse frequency which is applied to the reference voltage counter IC1. for the remainder of the phase 1 charge. The 1 state at the output of the inverter IC 22/2 also allows a relatively high charging current to flow to C7 via resistor R47. This causes the oscillator to pulse the reference voltage counter at a faster rate.

Once the oscillator starts delivering clock signals to the reference voltage counter the outputs of the latter begin to vary in binary sequence and the reference voltage at the R-2R ladder output begins to rise in small steps. The minimum clock rate, as determined by R48, is sufficient to cause the reference voltage to rise at a rate of for example, 0.025V per hour. The maximum clock rate as determined by R47, in parallel with R48, is sufficient to cause the reference voltage to rise at a rate of, for example, 0.1V per hour.

When the reference voltage has risen by a small amount it then exceeds the battery input voltage which will not have moved much from the 2.36V value. The comparator output therefore changes back to the 1 state. The output of NOR gate IC 22/3 (FIG. 4) goes to a 0 state and the battery charging current begins to increase slowly again. Also, the output of the inverter IC 22/2 goes to a 0 state and stops the extra charging current flowing to C7 via R47. The oscillator settles down to pulsing the reference voltage counter IC1. at the minimum rate.

After a time the battery voltage will normally exceed the reference voltage again. The above process of the battery charge current decreasing and the oscillator speeding up is repeated until the reference voltage again exceeds the battery voltage. The phase 1 charge proceeds in this manner, with the battery voltage and the rising reference voltage interacting to control the charge current and speed up the oscillator. The result is that the battery voltage is constrained to rise at a maximum rate of 0.1 V/c per hour.

Since the reference voltage counter IC1 is pulsed continuously at a minimum rate after 2.36 V/c has been reached then from this point onwards a given count of the reference voltage counter will occur within a known maximum time. The actual time at which the given count will occur will depend on the number of clock pulses received at the fast rate. Thus a NAND gate connected to selected counter outputs will change its own output after a known maximum time. To this effect a 4-input NAND gate IC 18/1 507 has its inputs connected to the counter outputs Q11 through Q14. When all these outputs change to the 1 state the output of the NAND gate changes from a 1 to a 0 state. This signal to a line 63 is used to give the required maximum time limit to the phase 1 charge. With the timing values chosen this is about 22 hours after the battery voltage has reached 2.36 V/C.

The outputs of the reference voltage counter provide a binary digital code for each value of reference voltage. Therefore any value of reference voltage can be detected simply by a logic gate connected to the appropriate counter outputs. To this effect a 4-input NOR gate IC 17/1 (506) has its inputs connected to the counter outputs Q11 through Q14. When one or more of these outputs change to the 1 state the output of the NOR gate changes from the 1 to the 0 state. This is passed through an inverter IC 21/1 to invert the change, i.e. the inverter output on a line 64 changes from 0 to 1. The above digital code is selected to give a continuous signal at a reference voltage of 2.40V and all values above 2.40V. The resulting 1 state at the output of the inverter IC 21/1 is applied to the minimum current detector logic section to initiate the logic programme for this section.

Minimum Current Detector VI FIG. 6

The minimum current detector comprises three subsections, a current to frequency converter 601, an up/down counter 602, and the programming logic 604 (shown respectively at the bottom, center and top of the FIG.).

The current to frequency converter comprises a resetting integrator. The integrating amplifier IC 13 receives a voltage signal from the battery charging current sensing resistors R96 and R97 via the line 51. The ripple in the voltage due to the pulsating nature of the battery charge current is first averaged out by an RC filter R74, C19 then applied to the integrating amplifier. The battery negative terminal, representing the zero voltage reference point, is connected to the inverting input of the amplifier via an integrating input resistor R73. The negative end 51 of the current sensing resistors is connected to the non-inverting input. The integrating capacitor C17 is connected between the inverting input and the output of the amplifier.

The reset circuit is connected across the integrating capacitor C17 and it acts to short circuit the capacitor when the voltage across it reaches a certain value. In operation the output voltage of the amplifier and thus the left hand plate of the capacitor decreases negatively in a linear manner at a rate proportional to the average battery charge current. Thus the right hand plate of the capacitor C17 becomes positive with respect to the left hand plate. This positive voltage is applied to the emitter-base junction of a transistor Tr8 to build up a reverse bias across it. Since Tr8 is a silicon transistor, the emitter-base junction breaks down when the reverse bias reaches about 9V. When this occurs the reverse current, which is limited by a resistor R72, flows through the forward biased emitter-base junction of a Transistor Tr9. The latter conducts and is held in conduction by the action of transistor Tr8 operating in the inverse mode. In this condition the emitter of Tr8 acts as the collector and the collector acts as the emitter. The change over to the inverse mode of operation of Tr8 is facilitated by the capacitor C16 which provides a momentary low impedance path for the current through Tr8.

Once the inverse operation of Tr8 has been established a substantial base current flows into the transistor Tr10 via the emitter-base junction of Tr9 and the inverted configuration of Tr8. Transistor Tr10 is driven into conduction to discharge C17 very rapidly. The discharge proceeds until the voltage across C17 has fallen to a low level. The reset circuit then reverts to its non-conducting state and the capacitor 17 begins to charge up again.

The action of the reset circuit gives a sawtooth waveform at the output 65 of the amplifier. Since the slope of the ramp of the sawtooth waveform is proportional to the average battery current, and the peak value of the ramp voltage is constant, then the repetition rate of the sawtooth waveform is proportional to the average battery current.

The output of the amplifier is applied to the base of a transistor Tr7 via a capacitor C15 and a resistor R68. Each time the integrating capacitor C17 is reset, a pulse of current is delivered to the base of Tr7 to give a negative going rectangular pulse at the collector of Tr7 applied across the collector resistor R67. This pulse has a repetition rate which is proportional to the battery charge current. It is applied via a line 66 to the pedestal voltages generator circuit (FIG. 4) to indicate the start of charge current. It is also applied to the clock input of a 12 stage up/down binary counter via a NOR gate IC 23/3.

The 12 stage up/down (or bi-directional) binary counter 602 is implemented by three 4 stage counter IC9, IC10 and IC11 connected in cascade. The counters used in the present example are from the RCA range of C/mos digital circuits and the interconnections shown apply only to this make of counter. Other makes of counter may have some differences in the interconnections but the overall result, i.e. the provision of a 12 stage up/down counter, will be the same. The up or down count mode is selected by a logical 1 or 0 respectively applied at the up/down (U.D.) inputs from an inverting gate IC 20/2. A reset to zero count is accomplished by a logical 1 applied at the preset enable (P.E.) inputs from a NOR gate IC 20/3. The clock pulses are applied to the CL inputs from the NOR gate IC 23/3, which is gated from an inverter IC 20/4. When counting down, the zero state is detected by a 4-input NOR gate IC 17/2 (605) of which 3 inputs are connected to the carry out (C.O) output of each counter and the remaining input is connected to the up/down signal gate IC 20/2. The output 70 of IC 17/2 changes to logical 1 only when all three counters reach the zero states when counting down, providing a signal to end the main Phase 1 change and go over to Phase 2.

The cycle of operations for the up/down counter is programmed by a 7-stage binary counter IC5 (604). The state of the outputs Q6 and Q7 of the latter determine the action of the up/down counter at any particular time. The state of the outputs Q6 and Q7 also affects the speed of an oscillator providing clock pulses to the 7-stage counter so that the latter alters its own clock rate several times throughout a complete cycle of events.

The oscillator 603 providing clock signals for the 7-stage counter IC5 is a conventional arrangement using a programmable unijunction transistor PUT1. Negative going rectangular pulses are provided at the junction of resistors R42 and R43 and these are applied to the clock input CL of the counter IC 5 via an inverting gate IC 20/1. The oscillator includes a timing capacitor C6 which is fed from various logic outputs through three resistors, R38, R39 and R40 to provide three different clock rates.

The slowest clock rate, is provided by current through the line 64 and resistor R38 when the output of the 2.40V gate IC 17/1 (FIG. 5) changes to a logical 0. Once the latter signal occurs the current feed through R38 is maintained throughout the remainder of the charge, including phase 2 charge (although the latter effect is of no importance).

The next two clock rates are both several times faster than the slowest rate and only differ between themselves by a few percent, for example 5%. The speed up is due to a higher current feed which flows to the capacitor C6 via the resistor R39 from the Q6 or a $\overline{Q7}$ output of the 7-stage counter IC5. The $\overline{Q7}$ output is the inversion of the Q7 output and is obtained from the output of the inverter IC 20/2 connected to the Q7 output of the counter, OR logic is performed by the two diodes D1 and D2 so that when either Q6 or $\overline{Q7}$ changes to logical 1 the clock rate is speeded up several times.

One of the two fast clock rates is made slightly faster than the other, say 5% faster, by providing a small amount of extra current to the capacitor C6 whenever the inverted output $\overline{Q7}$ of the 7-stage counter changes to a logical 1. This current is fed to C6 via a blocking diode D3 and the resistor R40 which has a high value. Since the Q7 output controls the direction of the count of the up/down counter, via the inverter IC 20/2, then the 5% increase in clock rate occurs each time the down count mode is selected.

The variation in clock rate to the 7-stage counter gives different time periods for the various states of the Q6 and $\overline{Q7}$ outputs. The value of the resistor R38 is chosen so that the longest period, which occurs when Q6 and $\overline{Q7}$ are both in the 0 state is about 12 minutes. The value of resistor R39 is chosen so that the short period which occurs when both Q6 and $\overline{Q7}$ are in the 1 state is about 2 minutes. The value of resistor R40 is chosen so that the short period which occurs when Q6 and Q7 are in the 1 state ($\overline{Q7}$ in the 0 state), is about 1.9 minutes.

Thus according to the logic described above the up/down counter will be subjected to successive cycles of operation from the time the rising reference voltage reaches 2.40V. Each cycle will comprise four periods as determined by the state of the outputs of the gates IC 20/2, IC 20/3 and IC 20/4.

Starting from the point where the Q6 and Q7 outputs of the 7-stage counter IC5 are both 0, the up/down counter is in the up-mode but held in the reset to zero state, and the clock gate IC 23/3 is disabled. Current is being fed through $\overline{Q7}$ and R39 so that after 2 minutes Q6 changes to 1. This removes the reset signal and enables the clock gate to pulse the up/down counter. A count up is entered at a rate proportional to the battery charging current.

After a further 2 minutes the count up is stopped as the Q6 output changes back to 0 and the Q7 output changes to 1. ($\overline{Q7}$ =0). This state gives the long period of 12 minutes, during which time the up-count is held in the up/down counter. The latter is held ready in the down-count mode due to $\overline{Q7}$ being in the 0 state.

After the 12 minutes waiting period the Q6 output changes to 1 again to enable the clock gate and the count down proceeds. However since Q7 is now in the 1 state the count down time is shortened slightly due to the extra capacitor charging current through R40. The count down period thus lasts for 1.9 minutes only. Because of this shortening of the period the zero is reached only if the battery charging current has increased by 5% over the value it had when the count-up was in progress.

If the up/down counter does not reach zero, then after the 1.9 minutes count down period, when both Q6 and Q7 change back to the 0 state again, the counter is reset to zero to start the cycle again.

If the up/down counter reaches the zero during the count-down period then the zero detector gate IC 17/2 delivers a logical 1 signal via the line 70 to the phase 2 logic section so as to terminate phase 1 charging. Phase 2 charging then follows immediately.

Phase 2 Logic Section VII FIG. 7

The phase 2 logic conditions are imposed by the change of state of the outputs Q and $\overline{Q}$ of a phase 2 bistable IC 8/1 of a pulse charge initiation logic circuit 706. These outputs are initially reset to the logical 0 and 1 states respectively by a logical 1 to the reset R input via the line 58 from the initial reset gate IC 22/4 (FIG. 4). A logical 1 signal at the set S input changes Q and $\overline{Q}$ outputs to 1 and 0 respectively to impose phase 2 logic conditions. The Q and $\overline{Q}$ outputs of IC 8/1 then remain at 1 and 0 respectively for the duration of the phase 2 charge.

The logical 1 signal to the S input of the bistable IC 8/1 is derived from either the minimum current detector gate IC 17/2, (FIG. 6) via the line 70, and an inverter IC 21/2, or the maximum time gate IC 18/1 (FIG. 5) via the line 63. The outputs from these two gates are fed into a NAND gate IC 18/2 whose output is applied to the S input of the bistable. A logical 1 signal from the minimum current dectector gate IC 17/2 or a logical 0 signal from the maximum time gate IC 18/1 will cause a logical 1 at the S input of the bistable and thus initiate phase 2.

The phase 2 bistable IC 8/1 controls the lamp switching section. The bistable outputs Q and $\overline{Q}$ are applied to the bases of darlington pair transistors Tr1, Tr2 and Tr3, Tr4 respectively to switch on either the phase 1 lamp (amber) or the phase 2 lamp (green). The former is on when $\overline{Q}$ is at logical 1 and the latter is on when Q is at logical 1.

The $\overline{Q}$ output of the phase 2 bistable is applied only to the indicating lamp section. The Q output is also applied to the lamp section but, in addition, it is applied via the line 62 to the NOR gates IC 21/3 (FIG. 5) and IC 22/3 (FIG. 4) and NAND gate IC 19/3. It disables the NOR gates and enables the NAND gate. During phase 1, when the Q output is at logical 0, the NOR gates are enabled and the NAND gate disabled. During phase 2, when the Q output changes to logical 1, the condition is reversed. The NOR gates are disabled and the NAND enabled.

With the NOR gate IC 21/3 (FIG. 5) disabled no further clock pulses are delivered to the PRV counter IC 1. Also with the NOR gate IC 21/3 disabled the PRV voltage comparator IC 4 has no further control over the battery charging current. The transistor Tr5 (FIG. 4) remains non-conducting throughout phase 2.

In phase 2 the voltage pedestal generator is operated by the output of the NAND gate IC 19/3 which in turn is operated by the Q output of a bistable circuit IC 6/1. Three input signals are applied to the latter via appropriate logic gates.

The first input is applied from a voltage comparator IC2, of a voltage comparator circuit 703, to the reset R input via an inverting gate IC 22/1. This voltage comparator compares the battery voltage per cell on open circuit with a reference voltage of 2.18V obtained from a voltage divider R32, R33 and Vr2 (702). The output of the comparator is passed through a RC noise filter R35 and C4 before being applied to the inverting gate IC 22/1. When the open circuit battery voltage per cell falls to 2.18V the comparator output changes from a logical 1 to a logical 0 state. A logical 1 state is then applied to the bistable R input, via the inverter, and the bistable Q output changes from a 1 to a 0 state. The output of the NAND gate IC 19/3 therefore changes from the 0 to 1 and this causes the voltage pedestal generator to start up in the same manner as that at the beginning of the phase 1 charge. That is, the pedestal voltage first rises rapidly until the start of battery charge current then, due to the change of state of the $\overline{Q}$ output of the bistable IC 6/2 when current flows, it continues to build up relatively slowly. The battery charge current thus builds up slowly at the start of a phase 2 charge current pulse.

It is convenient at this stage to point out that the pedestal voltage generator bistable IC 6/2, of the circuit 705, is first reset ($\overline{Q} = 1$) at the initiation of a phase 2 current pulse and then is set ($\overline{Q} = 0$) as soon as the current begins to flow. The pedestal voltage F.E.T. Tr6 can only supply the pedestal voltage when the output of the NAND gate IC 19/3 is at logical 1. As soon as the latter changes to a logical 0 the pedestal voltage will be rapidly cancelled and the battery charge current brought rapidly to zero.

The other two inputs of the bistable IC 6/1 operate on the set S input so as to rapidly bring the battery charge current to zero again. A logical 1 on the S input sets the Q output to 1 and thus the output of the NAND gate IC 19/3 on the line 57 changes from a 1 to a 0 so as to rapidly cancel the pedestal voltage. It also applies a logical 0 to an input of the NAND gate IC 19/4 (FIG. 4) to reset the $\overline{Q}$ outputs of the bistable IC 6/2 to a 1 state ready for the start of the next phase 2 charge current pulse. The set S input of IC 6/2 is locked at the 0 state by the logical 0 applied to the inverter IC 23/1 which then holds a logical 1 on one input of the NOR gate IC 23/2.

The two inputs which operate on the set S input of the bistable IC 6/1 control the duration of a phase 2 current pulse. One of these inputs operates on battery voltage and the other operates on time duration. Both are applied through a NAND gate IC 19/1 to the S input of IC 6/1. The battery voltage signal is derived from a voltage comparator IC3, of a final PRV voltage comparator circuit 701, via an RC noise filter R37 and C5. The battery voltage per cell is compared with the reference voltage on the line 59 finally attained at the output of the R-2R ladder network (FIG. 5). When the battery voltage per cell during a phase 2 current pulse reaches the final value of the reference voltage the output of the comparator changes from a logical 1 to a logical 0 state so as to provide a 1 at the output of the NAND gate IC 19/1.

The time duration signal is obtained from the output of a NAND gate IC 19/2 which receives inputs from the Q4 and Q6 outputs of a 7-stage counter IC7, of the circuit 704. This counter receives clock pulses via the line 67 from the rising reference voltage oscillator (FIG. 5) via an inverter IC 21/4. During a phase 2 current pulse this oscillator delivers clock pulses to IC7 at the phase 1 slow rate. This rate is such that the Q4 and Q6 outputs change from 0 to 1 states after about 4 minutes. Thus the output of the NAND gate IC 19/2 changes from 1 to 0 4 minutes after the start of a phase 2 charge current pulse. The counter IC7 is prevented from operating during an open circuit period by a logical 1 applied to its reset R input from the Q output of the bistable IC 6/1.

Thus a phase 2 charge current pulse is terminated when either the battery voltage per cell reaches the final value of the reference voltage, or a time of 4 minutes elapses.

The appropriate bistable and counter units are reset to the correct initial states by a signal from the initial reset (I.R.) section (described above under the heading Preset Rising Voltage PRV Control FIG. 4). This signal occurs only when the battery is first connected to the charger and it persists for about 1 second.

The initial reset signals are applied to the two counters IC1 (FIG. 5) and IC5 (FIG. 6), and to the three bistables IC 8/1 (FIG. 7), IC 8/2 (FIG. 5) and IC 6/2 (FIG. 4). The signal to the last of these is applied from the capacitor C8 via the NAND gate IC 19/4 (as already described). The remainder are applied direct to the Reset R inputs from the output of the inverter IC 22/4.

The initial states of the counters and bistables not receiving initial reset signals are correctly set as a consequence of the logic applied to them.

Power Supplies VIII FIG. 8

With the exception of the +V3 supply all the supplies are derived from the secondary winding T2/3 of the auxiliary transformer T2. The +V3 supply, which supplies most of the logic sections, is derived from the battery so as to prevent mains failures from upsetting the logic sequences and, in particular, to hold the phase 2 state throughout mains failures.

Diodes D9, D10 and D11 provide rectification for the +V1 and +V2 supplies. The +V1 supply is not smoothed or stabilised and provides power for the indicating lamps only. The +V2 supply is smoothed and stabilised by resistors R63 and R64, capacitor C13 and zener diode ZD2. It provides a small amount of power for the charging of the pedestal voltage capacitors C9 and C10 and also for the positive voltage supply of the amplifier IC 13 used in the current-to-frequency converter.

The negative voltage supply for the current-to-frequency amplifier IC13 is provided by the $-$V2 supply which is numerically equal to +V2 but of reverse polarity. The $-$V2 supply is rectified by diode D8 and smoothed and stabilised by resistors R65 and R66, capacitor C14 and zener diode ZD3.

The +V3 supply, which supplies the remainder of the logic sections, is obtained from the battery via a voltage dropping resistor R2 whose value depends on the number of cells in the battery. A diode D18 is included in series with R2 to prevent operation of the charger if the battery is reverse connected to it. The battery voltage is then applied to an integrated circuit voltage regulator IC 12 across the input of which is connected a zener diode ZD1 to limit the maximum voltage applied to the regulator input.

The connections shown for the regulator apply only to the particular type used in the present circuit i.e. type LM 723 CN. Other types may have different connections but the overall result, i.e. the provision of a stabilised output voltage, will be the same. The output voltage in the present case is set by the relative values of resistors R59 and R60. A resistor R61 limits the maximum current which can be supplied by the regulator to about 60 mA. Current surges occurring during the switching times of the C/mos logic units are provided for by a capacitor C11 connected across the +V3 supply. This prevents the surges from causing negative spikes in the +V3 voltage.

What we claim as our invention and desire to secure by Letters Patent is:

1. Automatic charging apparatus for charging discharged electric batteries, comprising means for establishing a reference voltage, a comparator for comparing the battery voltage with the reference voltage, means for automatically adjusting the charging current during at least a phase of the charge to bring the battery voltage closer to the reference voltage, and means for progressively increasing the reference voltage, at either of two different rates, the said means being controlled by the comparator to select a higher rate when the battery voltage exceeds the reference voltage and a lower rate when the battery voltage is less than the reference voltage.

2. Apparatus as claimed in claim 1, in which said means for increasing the reference voltage comprise a pulse generator, a binary counter for counting the pulses, and a digital to analog converter for converting the count of the counter into an analog signal representing the reference voltage.

3. Apparatus as claimed in claim 1 in which said digital-to-analog converter is of the R-2R ladder type.

4. Apparatus as claimed in claim 3 in which the reference voltage is kept constant at the beginning of the charge until the battery voltage reaches a predetermined value.

5. Apparatus as claimed in claim 1 further comprising ramp current controlling means for restricting the charging current when switched to a gradually changing value restricting the rate of changes of battery charging current so as to rise gradually when the battery voltage falls short of the progressively rising reference voltage and to fall gradually when the battery voltage exceeds the progressively rising reference voltage.

6. Apparatus as claimed in claim 2 in which the pulse generator comprises a resistor capacitor network connected to a programmed uni-junction transistor and means controlled by the comparator serves to change the effective value of the resistor depending on whether the battery voltage exceeds or falls short of the reference voltage.

7. Apparatus as claimed in claim 1 further comprising a minimum current detector for responding when the charging current begins to rise towards the end of the charge and then terminating at least a phase of the charge.

8. Apparatus as claimed in claim 7 further comprising a maximum voltage detector arranged to terminate at least a phase of the charge if the reference voltage exceeds a predetermined maximum value.

9. Apparatus as claimed in claim 8 in which the device responsive to a maximum voltage comprises an AND gate connected to the appropriate stages of the reference voltage binary counter to give a signal when the count therein reaches the appropriate value.

10. Apparatus as claimed in claim 7 in which the minimum current detector includes a pulse generator whose frequency is proportional to the charging current, and a programming counter and an up-down counter for counting the pulses, the up-down counter being controlled by the programming counter so as to count up for a predetermined up period then to store the count for a first predetermined interval and thereafter to count down for a down period slightly less than the up period, and zero detecting means serving to terminate at least a phase of the charge, only when the up-down counter returns to zero, whereby the frequency applied to the up-down counter, and representing the value of the charging current, is greater in the down period than in the up period.

11. Apparatus as claimed in claim 10 in which the zero detecting means comprise an OR gate connected to the appropriate stages of the binary counter to give a signal when the count therein reaches the zero value.

12. Apparatus as claimed in claim 10 in which the programming counter is fed from a clock pulse generator and is arranged to adjust the latter to increase its frequency during the down period, to a value higher than that during the up period, so that an equal count occurs in a shorter period.

13. Apparatus as claimed in claim 7 further comprising means for rendering the minimum current detector operative only when the reference voltage exceeds a given intermediate value to prevent the minimum current detector from responding when the charging current begins to rise in the early stages of the charge.

14. Apparatus as claimed in claim 13 in which the means for initiating operation of the minimum current detector includes an OR gate connected to the appropriate stages of the reference voltage binary counter and serving to give a signal when the reference voltage reaches the intermediate value and continues to give a signal at any higher value of the reference voltage.

15. Apparatus as claimed in claim 7 further comprising means for delivering a main phase of the charge for the battery and terminating the main phase of the charge to give a topping-up phase during which a charging current is switched on when the open circuit voltage of the battery reaches a predetermined lower value and switched off when it rises above a predetermined higher value.

16. Apparatus as claimed in claim 15 further comprising means for storing the value of the reference voltage reached at the minimum current during the first phase of the charge, to provide said predetermined higher value.

17. Apparatus as claimed in claim 15 further comprising maximum time limiting means for switching off the battery charging current after it has been switched on for a predetermined time interval if the battery voltage has failed to reach the predetermined higher value.

18. Apparatus as claimed in claim 1 further comprising means for intermittently switching the charging current on and off during at least a phase of the charge automatically, the switching on of the charging current being controlled automatically by means responsive to the battery voltage so as to switch on when the open circuit voltage of the battery falls to a given lower value including ramp current controlling means for restricting the charging current when switched on to a gradually increasing value, to afford time for the battery voltage to respond to the charging current.

19. Apparatus as claimed in claim 18 in which the ramp current controlling means restricts the charging current so as to rise from zero to its maximum value in not less than several minutes.

20. Apparatus as claimed in claim 18 in which the ramp current controlling means includes a resistor capacitor network connected to a field effect transistor arranged in a source follower configuration.

21. Apparatus as claimed in claim 1 in which the battery charging current is under phase control, and which includes means for adjusting a pedestal voltage, means for providing a ramp voltage changing progressively during each half cycle, means for comparing the ramp voltage with the pedestal voltage and triggering the phase control means when the difference changes sign.

22. Apparatus as claimed in claim 21 further comprising means for effecting an initial fast rise of the pedestal voltage until the battery charging current begins to flow and thereafter limiting the rate of rise of the pedestal voltage and hence of the battery charging current.

* * * * *